(12) United States Patent
VanDenberg et al.

(10) Patent No.: US 7,726,674 B2
(45) Date of Patent: Jun. 1, 2010

(54) SUSPENSION ASSEMBLY

(75) Inventors: Ervin K. VanDenberg, Massillon, OH (US); David H. Croston, Navarre, OH (US)

(73) Assignee: Air Suspensions, Inc., Massillon, OH (US)

( * ) Notice: Subject to any disclaimer, the term of this patent is extended or adjusted under 35 U.S.C. 154(b) by 0 days.

(21) Appl. No.: 12/117,366

(22) Filed: May 8, 2008

(65) Prior Publication Data

US 2009/0278329 A1 Nov. 12, 2009

(51) Int. Cl.
*B60G 11/18* (2006.01)

(52) U.S. Cl. .................. 280/124.128; 280/124.116; 280/124.129; 280/124.153; 280/124.154; 280/124.157; 280/124.162; 280/124.164; 280/124.165; 280/124.175; 280/124.177; 280/86.5; 280/124.166; 180/65.5; 267/64.19; 267/64.23; 267/64.24; 267/189; 267/256; 267/257; 267/258

(58) Field of Classification Search .............. 267/64.19, 267/64.23, 64.24, 189, 256–258; 280/86.5, 280/124.116, 124.118, 124.157, 124.162, 280/124.164–124.166, 124.177
See application file for complete search history.

(56) References Cited

U.S. PATENT DOCUMENTS

| | | | |
|---|---|---|---|
| 2,998,981 A | 9/1961 | Derr | |
| 3,246,716 A * | 4/1966 | Kozicki | 180/292 |
| 3,784,221 A | 1/1974 | Frasier, Sr. | |
| 3,961,826 A * | 6/1976 | Sweet et al. | 301/125 |
| 4,171,830 A | 10/1979 | Metz | |
| 4,614,247 A * | 9/1986 | Sullivan | 180/24.02 |
| 4,966,386 A | 10/1990 | Werdich | |
| 5,161,814 A | 11/1992 | Walker | |
| 5,163,701 A | 11/1992 | Cromley, Jr. | |
| 5,215,328 A | 6/1993 | Bono et al. | |
| 5,215,331 A * | 6/1993 | Pittman | 280/788 |
| 5,277,450 A | 1/1994 | Henschen | |
| 5,366,237 A | 11/1994 | Dilling et al. | |
| 5,427,404 A | 6/1995 | Stephens | |
| 5,505,481 A | 4/1996 | VanDenberg et al. | |
| 5,505,482 A | 4/1996 | VanDenberg et al. | |
| 5,540,454 A | 7/1996 | VanDenberg et al. | |
| 5,683,098 A | 11/1997 | VanDenberg et al. | |

(Continued)

*Primary Examiner*—Ruth Ilan
*Assistant Examiner*—James English
(74) *Attorney, Agent, or Firm*—Sand & Sebolt

(57) ABSTRACT

A vehicle suspension system includes a pair of suspension assemblies mounted on a pair of spaced vehicle frame members for supporting a vehicle body on the vehicle wheels. A torsion axle extends between the pair of suspension assemblies and terminates in a pair of stub shafts. The axle is mounted on a pair of spaced frame brackets attached to the vehicle frame. An air spring extends between the vehicle frame and an outer end of a support arm pivotally mounted on each end of the torsion axle. The stub shafts are supported within an outer tube of the torsion axle by a plurality of elastomeric members. One end of each stub shaft is connected to a spindle arm which has a spindle extending from an opposite end of the arm. The length of the air spring support arm and the distances between the pivot axis of the support arm and the axis of the spindle and torsion axle are chosen so that the surface of the air spring is always out of contact with the mounting bracket and has a portion inboard between the axis of the spindle and axis of the torsion axle.

19 Claims, 12 Drawing Sheets

U.S. PATENT DOCUMENTS

| | | |
|---|---|---|
| 5,690,353 A | 11/1997 | VanDenberg |
| 5,718,445 A | 2/1998 | VanDenberg |
| 5,788,263 A | 8/1998 | VanDenberg |
| 5,820,156 A | 10/1998 | VanDenberg |
| 5,853,183 A | 12/1998 | VanDenberg |
| 5,924,712 A | 7/1999 | Pierce |
| 6,328,322 B1 * | 12/2001 | Pierce ................ 280/124.131 |
| 6,340,165 B1 * | 1/2002 | Kelderman .......... 280/124.153 |
| 6,752,411 B2 * | 6/2004 | Few .................... 280/124.169 |
| 7,416,200 B2 * | 8/2008 | Hass et al. ............ 280/124.116 |
| 7,516,821 B2 * | 4/2009 | Powers ..................... 188/18 A |
| 2002/0149164 A1 * | 10/2002 | Pierce et al. ................ 280/86.5 |
| 2003/0098564 A1 * | 5/2003 | VanDenberg et al. . 280/124.157 |
| 2004/0188973 A1 * | 9/2004 | Molitor ............... 280/124.166 |

* cited by examiner

SUSPENSION ASSEMBLY

BACKGROUND OF THE INVENTION

1. Technical Field

The invention relates to suspension systems for vehicles, such as trailers and trucks. More particularly, the invention relates to a suspension assembly having a torsion axle in combination with an air spring. Even more particularly, the invention relates to a more compact, lighter weight combination torsion axle-air spring suspension assembly than known prior art combination suspension assemblies.

2. Background Information

Torsion axles have been known for many years, such as shown in U.S. Pat. No. 2,998,981. Torsion axles have proven to be extremely popular because if one wheel hits a bump or rut, it can react independently of the other wheel, which may not hit a bump or rut at the same time. This torsion axle concept operates to keep a trailer moving as straight as possible behind a towing vehicle and absorbs some of the shock of the road over which it is passing with an independent suspension. This is contrasted with a straight axle where if one wheel drops into a rut or is slowed down for any reason while the other wheel of the trailer does not have the same experience at the same time, the trailer would tend to turn somewhat to allow the wheel that is on the flat part of the road to move forward while the wheel that is in the rut is restrained, therefore causing the axle not to be perpendicular with the direction of towing of the vehicle itself.

Most torsion axles are constructed of a square axle in cross section with elongated rubber members disposed in-between the square axle and a larger outer tube. U.S. Pat. Nos. 5,161,814 and 5,820,156 disclose such a construction. One common torsion axle is a TorFlex® rubber torsion suspension system distributed by Dexter Axle. This type of torsion axle has independent and separate stub axles or stub shafts on each end which are part of spaced suspension assemblies mounting each of the wheels on the trailer frame to enhance the independent aspect of such an axle.

Torsion axles can also be constructed as in U.S. Pat. No. 5,163,701 which uses a plurality of elongated bars which can twist and bend but return to their original position after such bending. It is also known to use air bags, commonly referred to as air springs, for straight, non-torsion axles, such as shown in U.S. Pat. Nos. 3,784,221 and 5,427,404. While it is true that both the torsion axle technology and the air spring technology has been quite successful independently in making a smoother ride and enhanced the handling performances of vehicles having such suspension systems, these suspension systems still have their shortcomings and there is a need for improvement thereto.

The vehicle suspension system of U.S. Pat. No. 6,340,165 combines the advantage of both the torsion axle and air spring into a single suspension assembly and has provided a more efficient and better performing suspension system than that believed provided by the systems using only a torsion axle or only an air spring.

The suspension assembly of the present invention improves on the system of U.S. Pat. No. 6,340,165 by providing a more rugged, compact, lighter weight structure by shortening the distance from the pivot axis of the air spring support arm to the axis of the torsion axle and to the centerline of the air spring. This results in lower torque on the axle tube in roll or diagonal walk or tramp. This lower beam stress enables lighter, less expensive beams and axle connections to be utilized. It provides less vertical axle tube motion and enables lower design heights to be achieved. The air spring of the present invention nests behind the axle tube and generally inboard of the swing arm, and provides better ground clearance particularly in rebound.

BRIEF SUMMARY OF THE INVENTION

The present invention relates to a vehicle suspension assembly for attachment to a vehicle frame having a torsion axle and at least two ground engaging wheels operatively rotatably attached to each respective end of the torsion axle. A frame attachment arm is adapted to be attached to the vehicle frame and has an air spring mounting arm operably pivotally attached to the frame attachment arm by a pivot axis. A torsion axle is received in an axle receiving portion of the air spring mounting arm and has an axis spaced a shorter distance from the pivot axis of the air spring mounting arm than taught by prior art air spring-torsion axle suspension systems, preferably in the range of between 3 and 6 inches. The air spring is operatively disposed between the frame mounting bracket and the air spring mounting arm and is spaced a shorter distance from the axis of the air spring mounting arm, preferably in the range of between 11 and 14 inches than prior art suspension systems. A spindle arm is operably attached to the outer end of the torsion axle and has a wheel spindle extending outwardly from a distal end of the spindle arm generally aligned with the air spring. A portion of the air spring is always located between the axis of the spindle and out of contact with the air spring mounting arm instead of outboard or beyond the spindle axis as in the prior art.

Thus, in accordance with one of the main features of the present invention, the short distances between the air spring support arm pivot axis and the torsion axle axis, and to the centerline of the air spring provides a vehicle suspension assembly which is of a compact and sturdy construction, which is adapted to be secured to the vehicle frame of the vehicle and supports one end of a torsion axle which extends across the vehicle between the spaced vehicle wheels, and which has a stub shaft pivotally mounted by elastomeric members within the interior of the torsion axle at each end of the axle, wherein the stub shaft is attached at an outer end to a spindle arm and has an air spring extending between the frame mounting bracket and the distal end of a mounting lever.

The improved suspension assembly provides good ride, excellent stability, axle-to-axle equalization and the ability to raise and lower the trailer for easier loading and unloading. Also, the combination of rubber and air in series provided by the torsion axle and air spring, respectively, ensures that the vehicle has some suspension and isolation even if the air system is not inflated or fails for any reason. Furthermore, the axle-to-axle equalization allows the use of torsion axles on multi-axle trailers that currently allow only single axle and tandem axle applications. The compact design is easily adaptable for capacities from 2,300 lbs to over 10,000 lbs. If desired, optional shock absorbers, air controls etc. can be incorporated easily into the final suspension assembly.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 1:
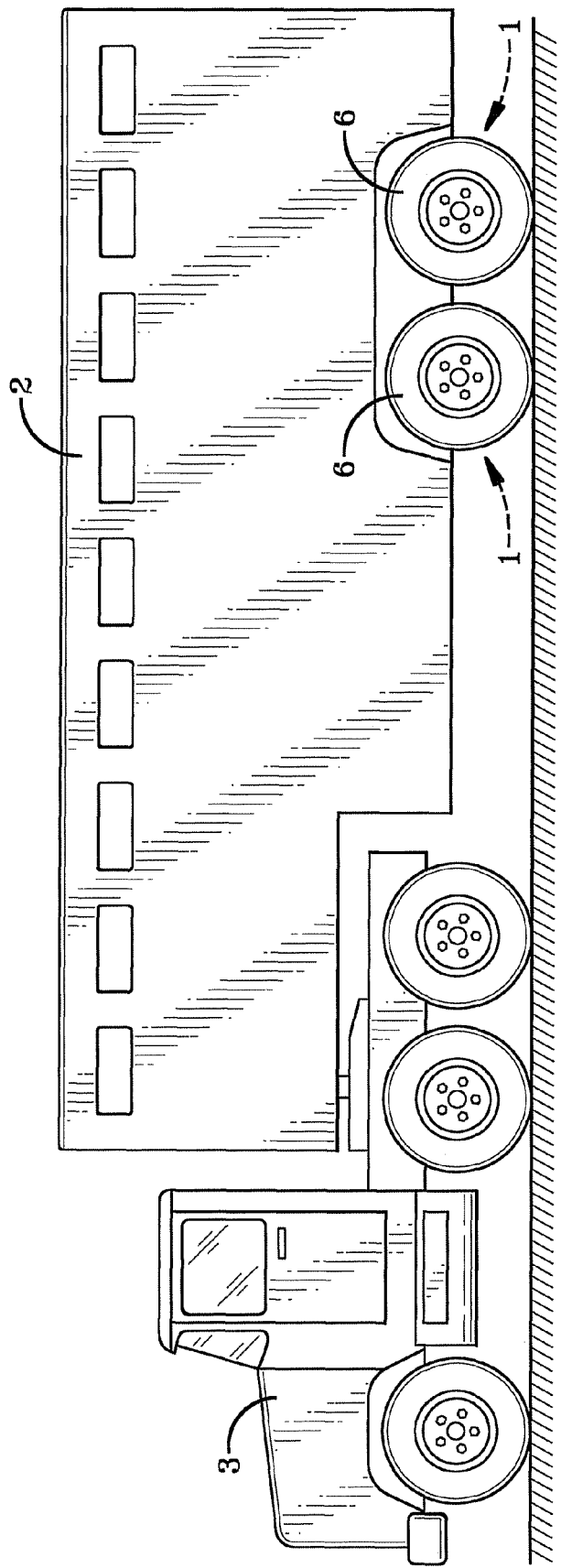
FIG. 1 is a diagrammatic side elevational view of a vehicle trailer on which the improved suspension assembly is mounted.
Figure 2:
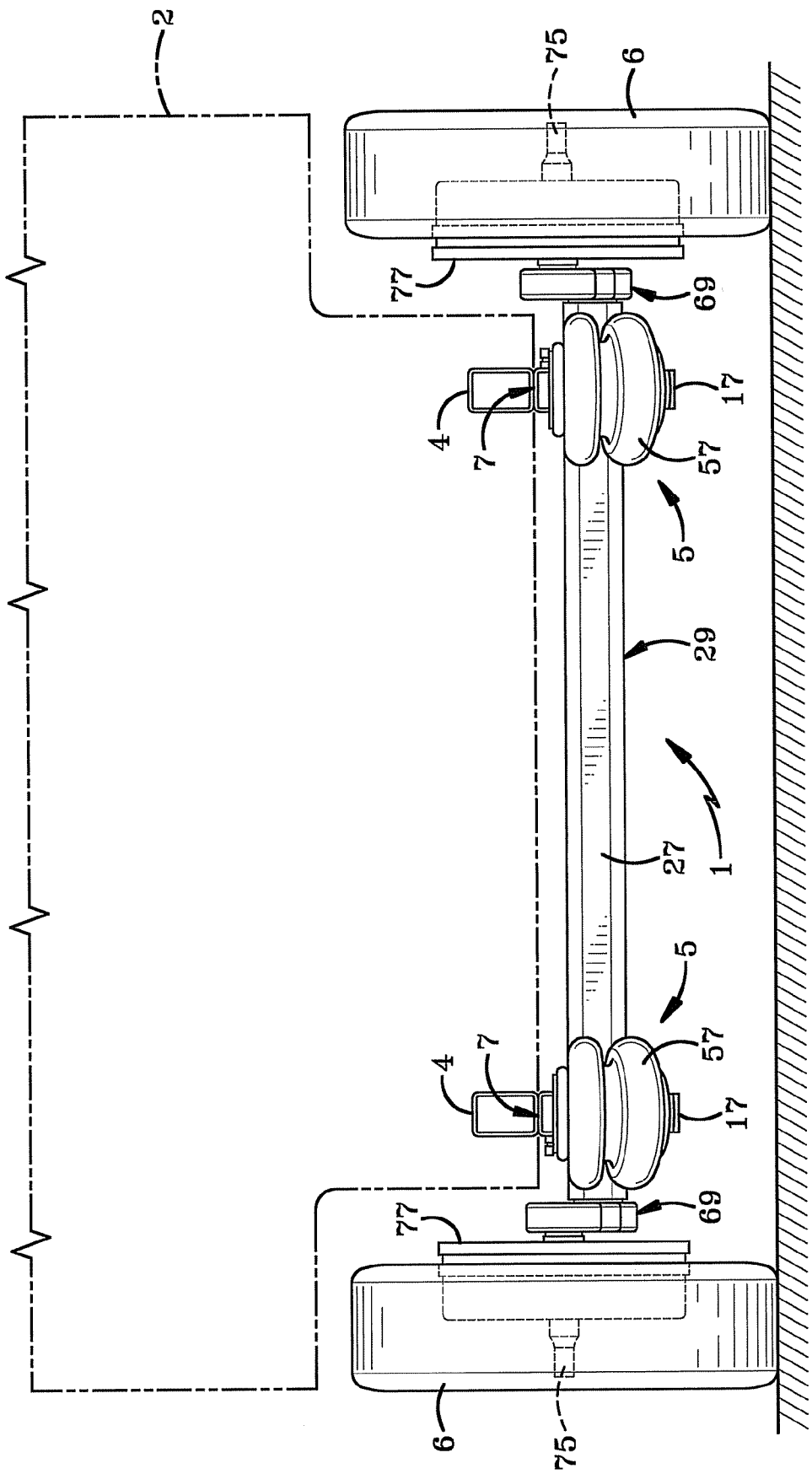
FIG. 2 is a rear elevational view of a pair of the improved suspension assemblies mounted on a trailer shown in dot dashed lines.
Figure 3:
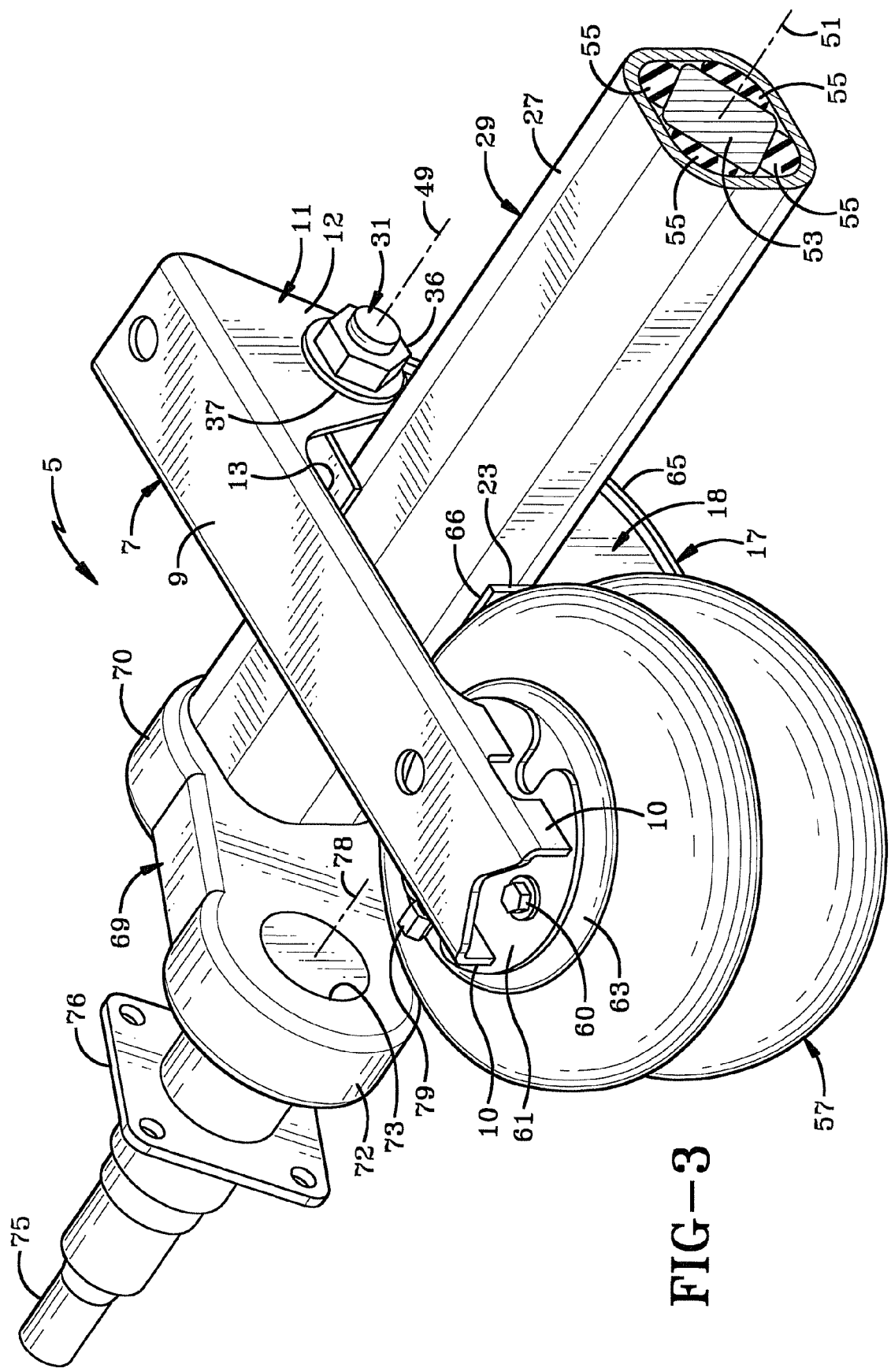
FIG. 3 is a perspective view of the improved vehicle suspension assembly of the present invention.

A vehicle suspension system having the improved suspension assembly of the present invention is indicated generally at 1, and is shown particularly in FIGS. 1-13 mounted on a vehicle 2, such as a trailer of the type being towed by a tractor 3. Trailer 2 is supported on a pair of frame rails 4 extending longitudinally along a length of the trailer (FIG. 2). A pair of the improved suspension assemblies, each indicated generally at 5, is mounted on a respective frame rail 4 generally adjacent a wheel 6. Suspension assembly 5 as best shown in FIG. 3, includes a frame mounting bracket 7 which is secured to one of the trailer frame rails 4 by a plurality of bolts, by welding or other types of attachments. Frame bracket 7 preferably has a U-shaped channel configuration with web wall 9 and a pair of spaced legs 10 terminating at one end in a depending end flange portion 11 (FIGS. 3 and 8) formed by a pair of spaced flange legs 12. Frame bracket 7 may be formed with a central cutout 13 and preferably has a plurality of reinforcing gussets 15 extending between each of the flange legs 12.

An air spring support arm indicated generally at 17, includes a pair of spaced support arm members 18, each of which has a curved generally L-shaped configuration (FIG. 7) with an upstanding upper mounting leg 19 and an elongated leg 21 extending outwardly angularly therefrom. A reinforcing plate 23 is connected to and extends along and between the top edges of arm members 18 and preferably is welded thereto. Each support arm member 18 is formed with an L-shaped cutout opening 25 complementary to an outer tube 27 of a torsion axle 29 which is secured therein by welding or other attachment means.

Air spring support arm 17 is pivotally mounted between flange legs 12 by a pivot bolt 31 (FIGS. 7-9) which extends through aligned holes 33 formed in flange legs 12 and includes a head 35 and a securement nut 36 which are spaced from flange legs 12 by washers 37. Preferably, a metal sleeve 39 is mounted on bolt 31 and is located within the bore 41 of an elastomeric bushing 43. Bushing 43 is located within an outer annular collar 45 which is secured within a generally semicircular cutout 47 formed in support arm members 18 and secured thereto by welds or other types of attachment means. Air spring support arm 17 has a pivot axis 49 which is spaced from and parallel with axis 51 of torsion axle 29 which is coaxial with the axis of outer tube 27 and a stub shaft 53 which is rotatably mounted within outer tube 27 by a plurality of elastomeric members 55. A stub shaft 53 is mounted within each end of torsion axle 29 by elastomeric members 55. Torsion axle 29 is similar to a well-known torsion axle, one type being sold under the trademark TOR FLEX® from Dexter Axle.

Figure 8:
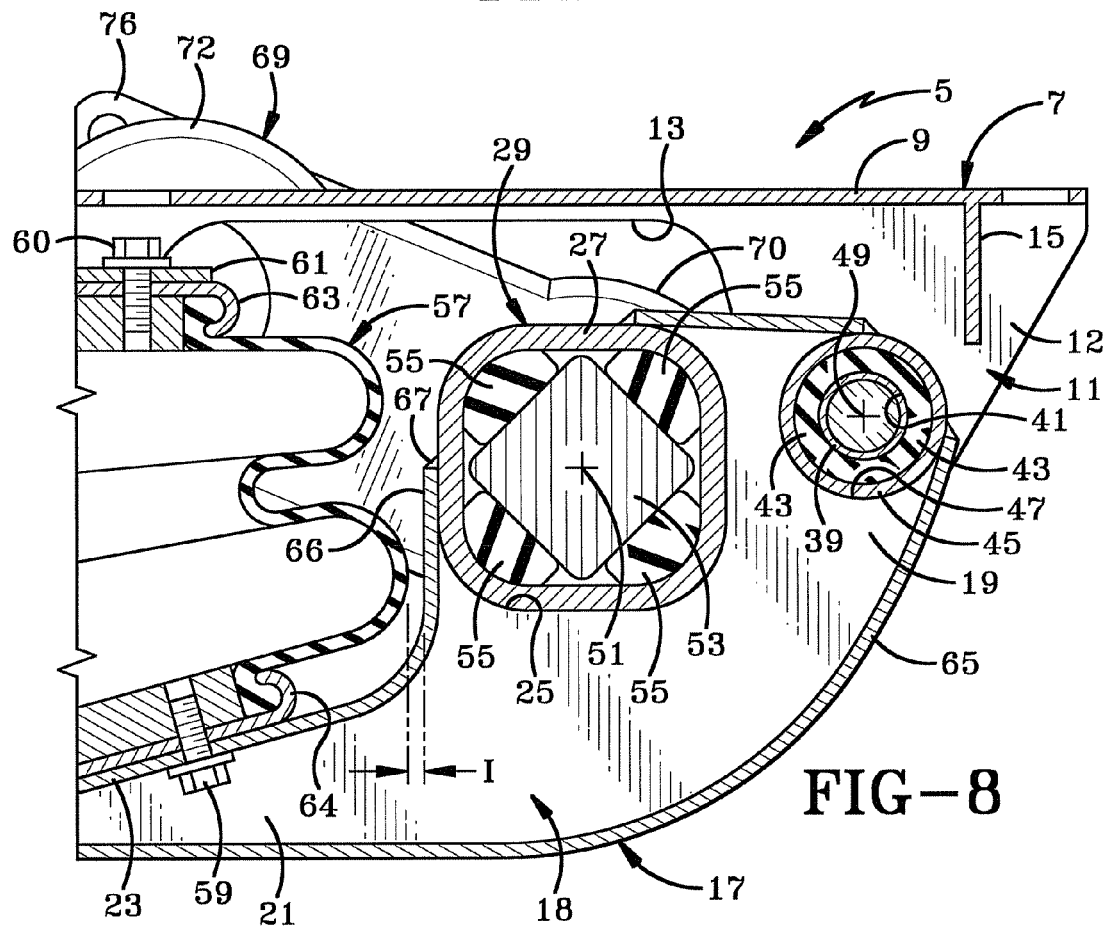
FIG. 8 is an enlarged sectional view taken on line 8-8, FIG. 5.
Figure 9:
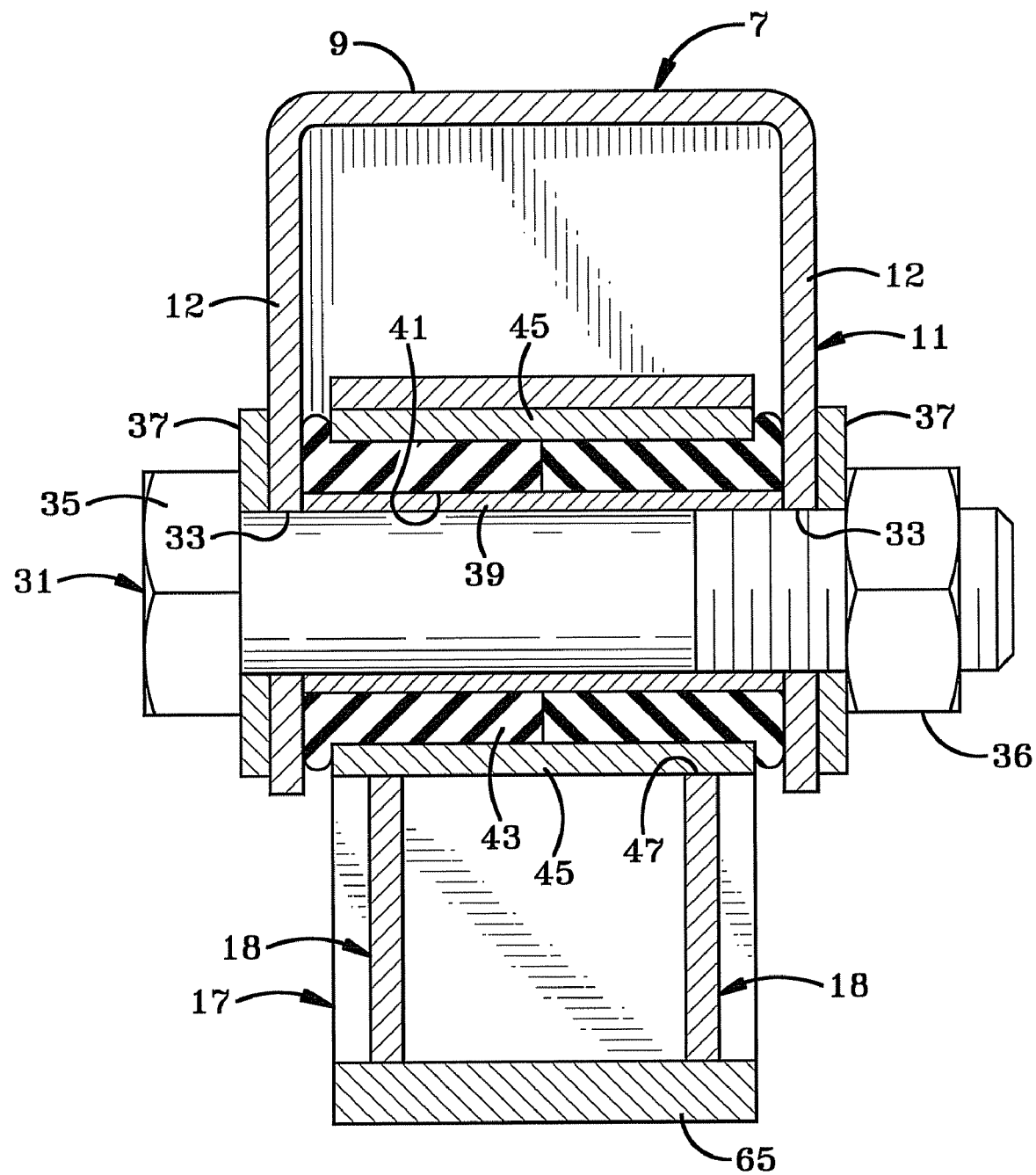
FIG. 9 is a greatly enlarged sectional view taken on line 9-9, FIG. 7.

An air spring 57 is secured at its lower end to reinforcing plate 23 by a plurality of bolts 59 (FIG. 8) and at its upper end by bolts 60 to a plate 61, which as shown in FIGS. 3 and 8, is secured to the top end plate 63 of air spring 57. Plate 61 extends beneath and is welded to the bottom edges of legs 10 of U-shaped flange mounting brackets 7. Air spring 57 is of a usual well-known construction having a flexible outer sleeve forming an internal air chamber.

A reinforcing plate 65 extends across the bottom edges of air spring arm members 18 and terminates and is secured to collar 45 by welding as shown in FIG. 8. Top reinforcing plate 23 terminates in an upwardly curved end 66 which is secured to outer tube 27 of torsion axle 29 by welds 67 or other attachment means. This provides for a sturdy and rigid air spring support arm 17 pivotally mounted on frame mounting bracket 7 by pivot bolt 31 and secured to outer tube 27 of torsion axle 29.

Figure 4:
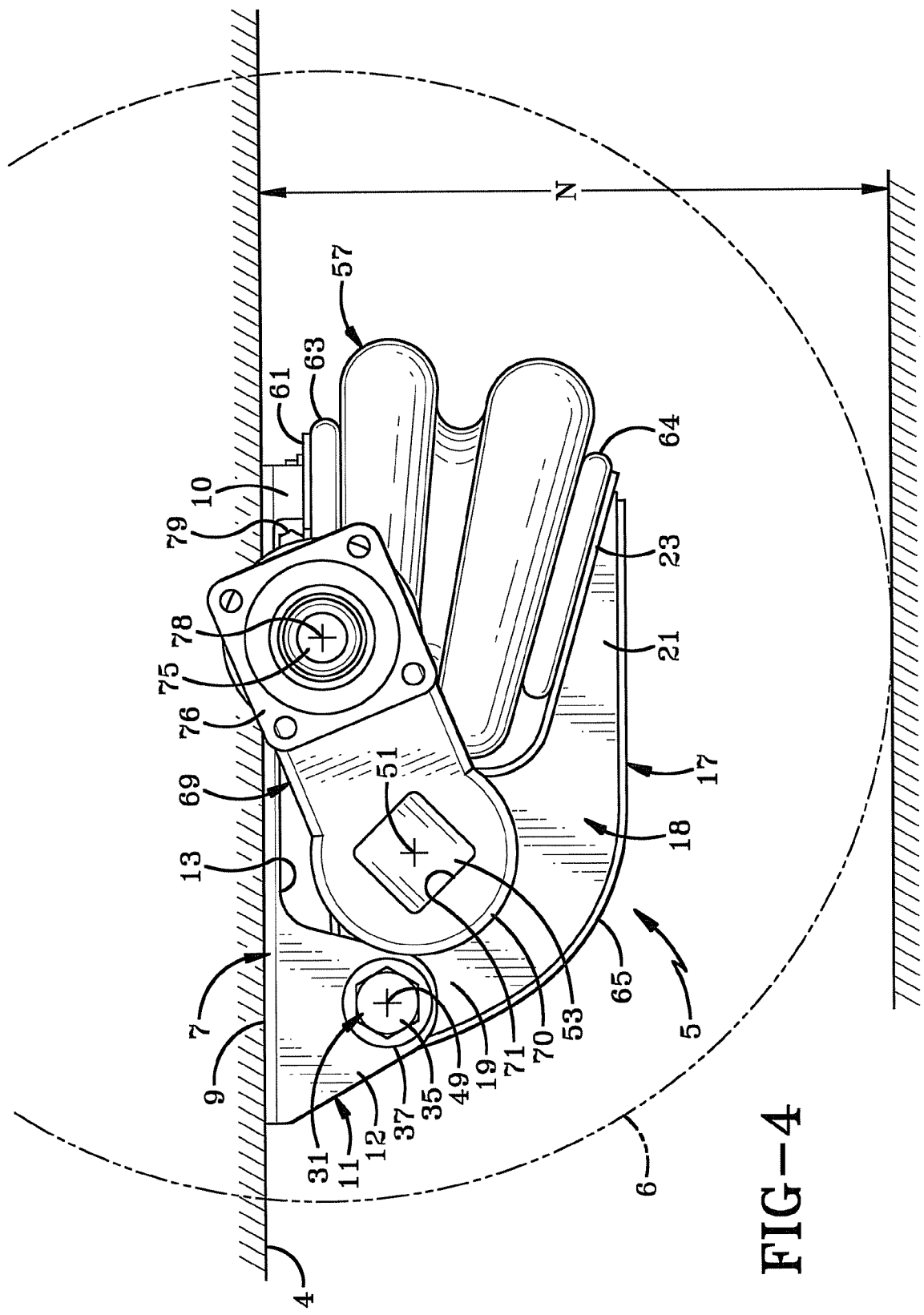
FIG. 4 is a side elevational view of the suspension assembly mounted on a vehicle with a ground engaging tire shown in dot dashed lines.
Figure 5:
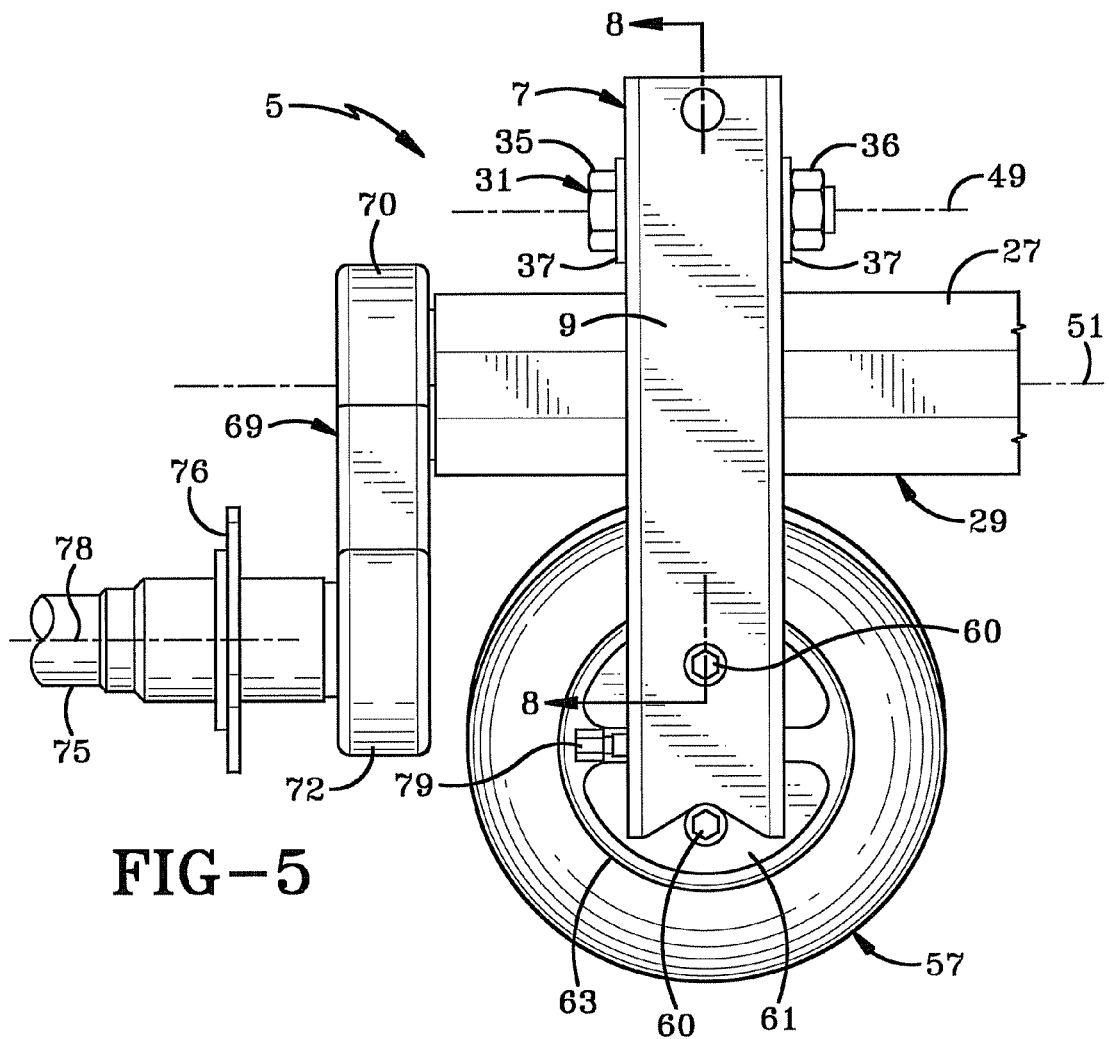
FIG. 5 is a top plan view of the improved vehicle suspension assembly.

A spindle arm indicated generally at 69 (FIG. 3), is attached at one end 70 to stub shaft 53 of torsion axle 29 preferably by welding, after the stub shaft extends through a complementary-shaped opening 71 formed in spindle arm end 70 (FIG. 4). Opening 71 may be a variety of shapes including rectangular without departing from the spirit of the present invention. The opposite or distal end 72 of spindle arm 69 is formed with a circular opening 73 (FIG. 3) in which one end of a spindle 75 is secured preferably by welds. A hub assembly mounting plate 76 is secured to spindle 75 for subsequent attachment of a wheel hub 77 thereto as shown in FIG. 2.

Figure 6:
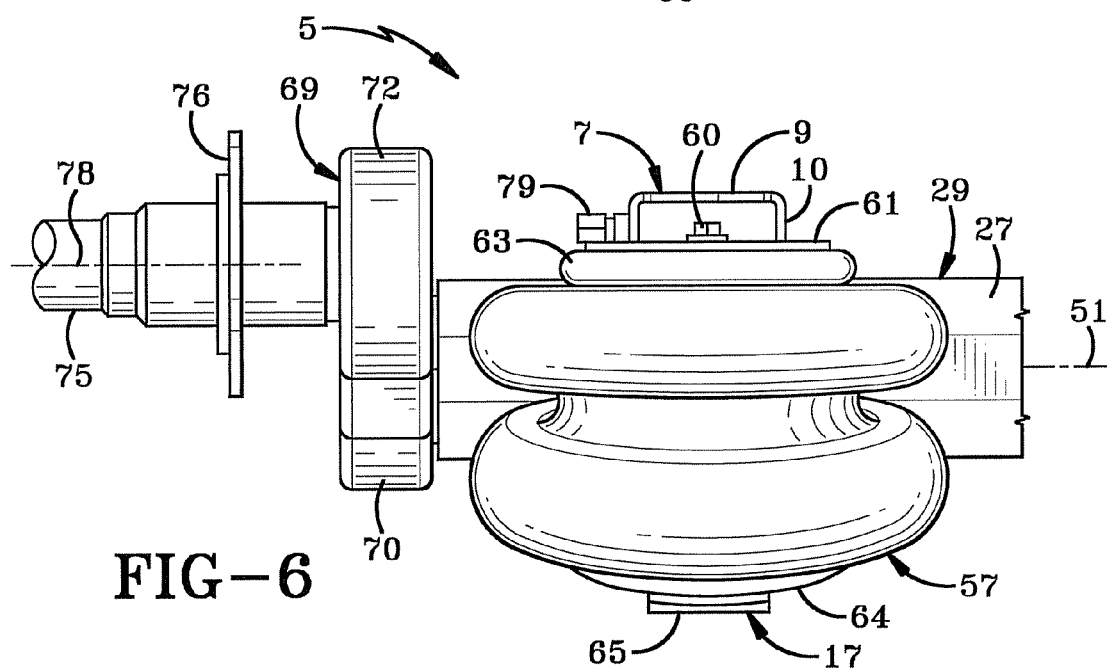
FIG. 6 is a rear elevational view of the suspension assembly of FIG. 5.
Figure 7:
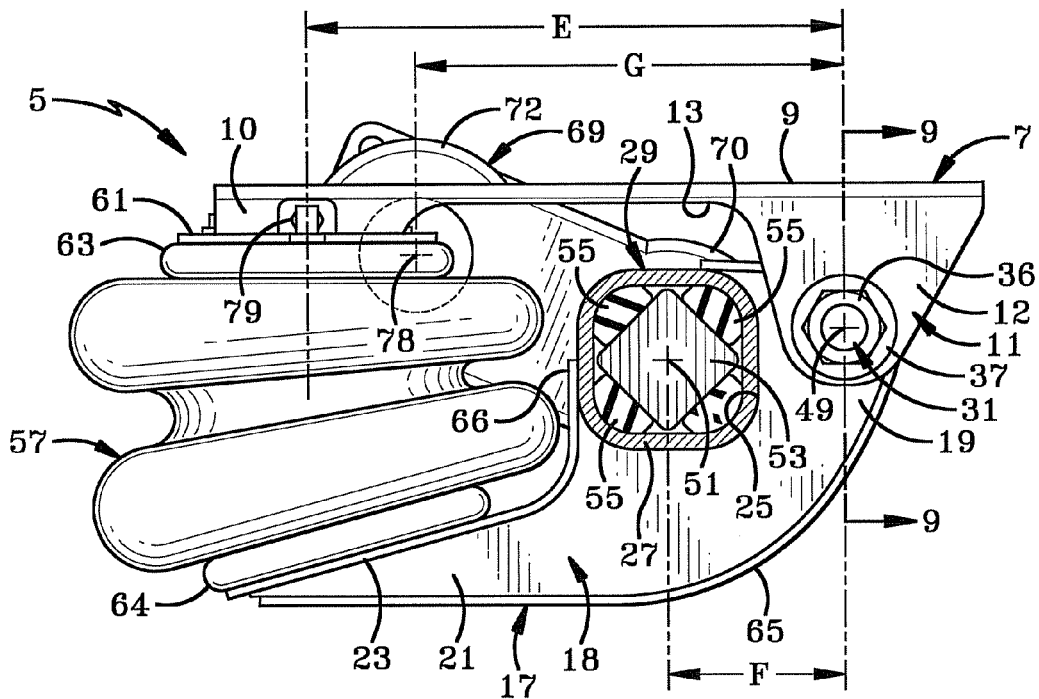
FIG. 7 is a side elevational view of the suspension assembly with the torsion axle shown in cross section.

Air spring 57 is shown as a double convolute air spring, but could be single or plural convolute air spring without affecting the concept of the invention. Furthermore, the air spring can use various types of internal fluid for its operation, although air is the preferred fluid which is supplied to the internal fluid chamber from a compressor (not shown) usually mounted within the tractor or trailer and connected to a coupler 79 by an air supply line (not shown). Coupler 79 is mounted on top end plate 63 of the air spring as shown in FIG. 6.

Figure 10:
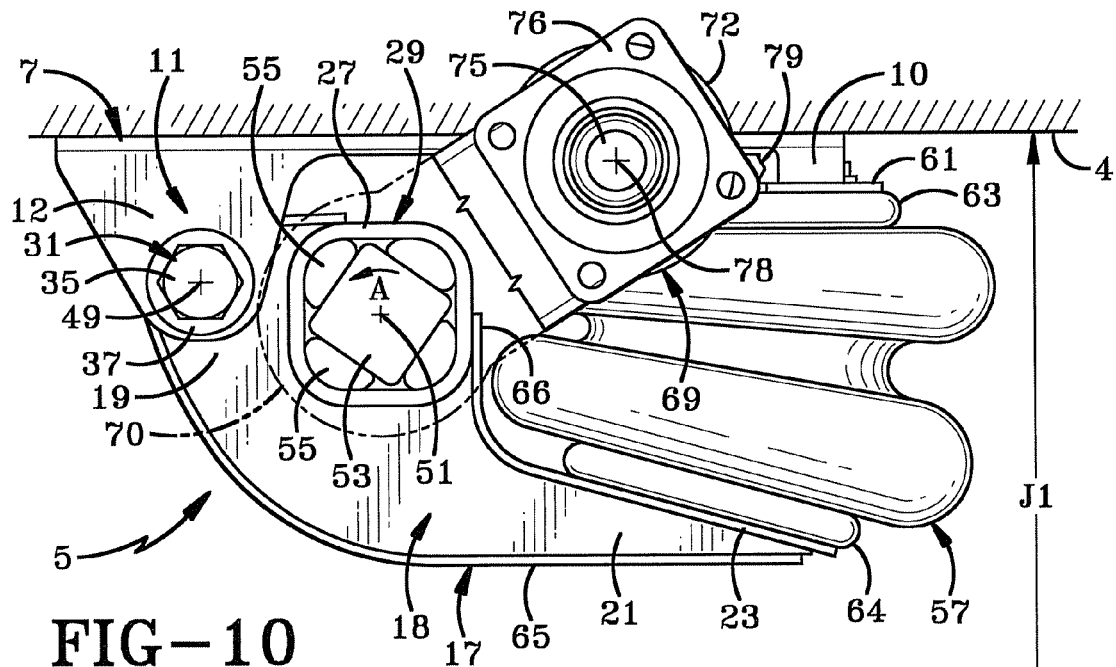
FIG. 10 is a side elevational view of the vehicle suspension assembly at the start of a jounce movement.
Figure 11:
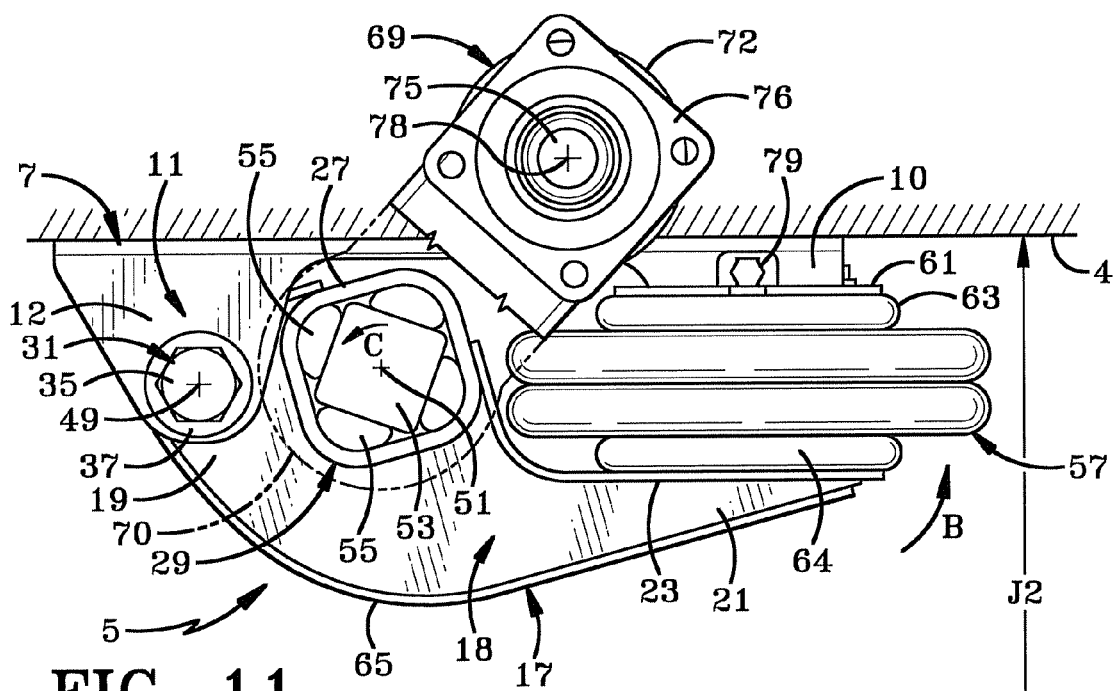
FIG. 11 is a view similar to FIG. 10 with the vehicle suspension assembly in a full jounce position.
Figure 12:
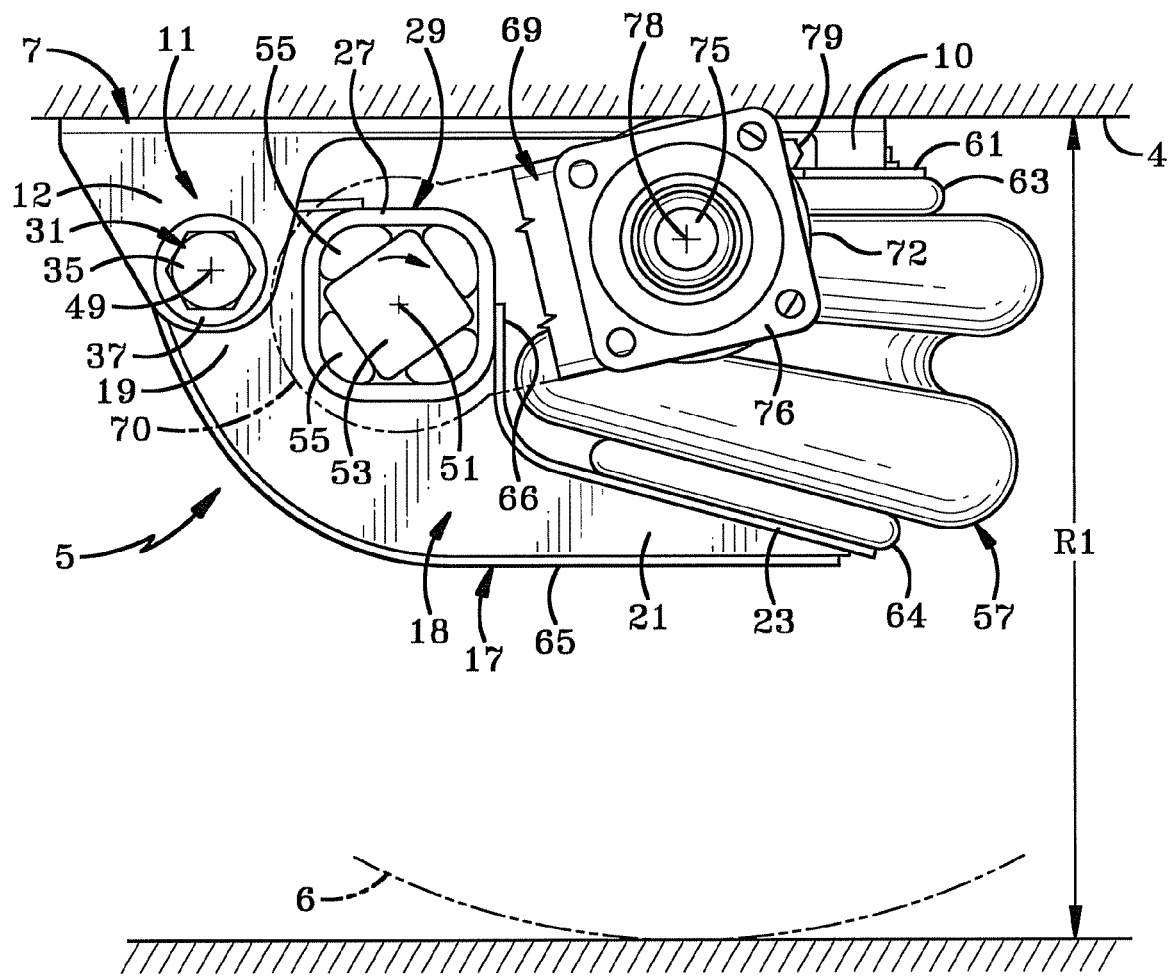
FIG. 12 is a view similar to FIGS. 10 and 11 with the vehicle suspension assembly starting to move toward the rebound direction.
Figure 13:
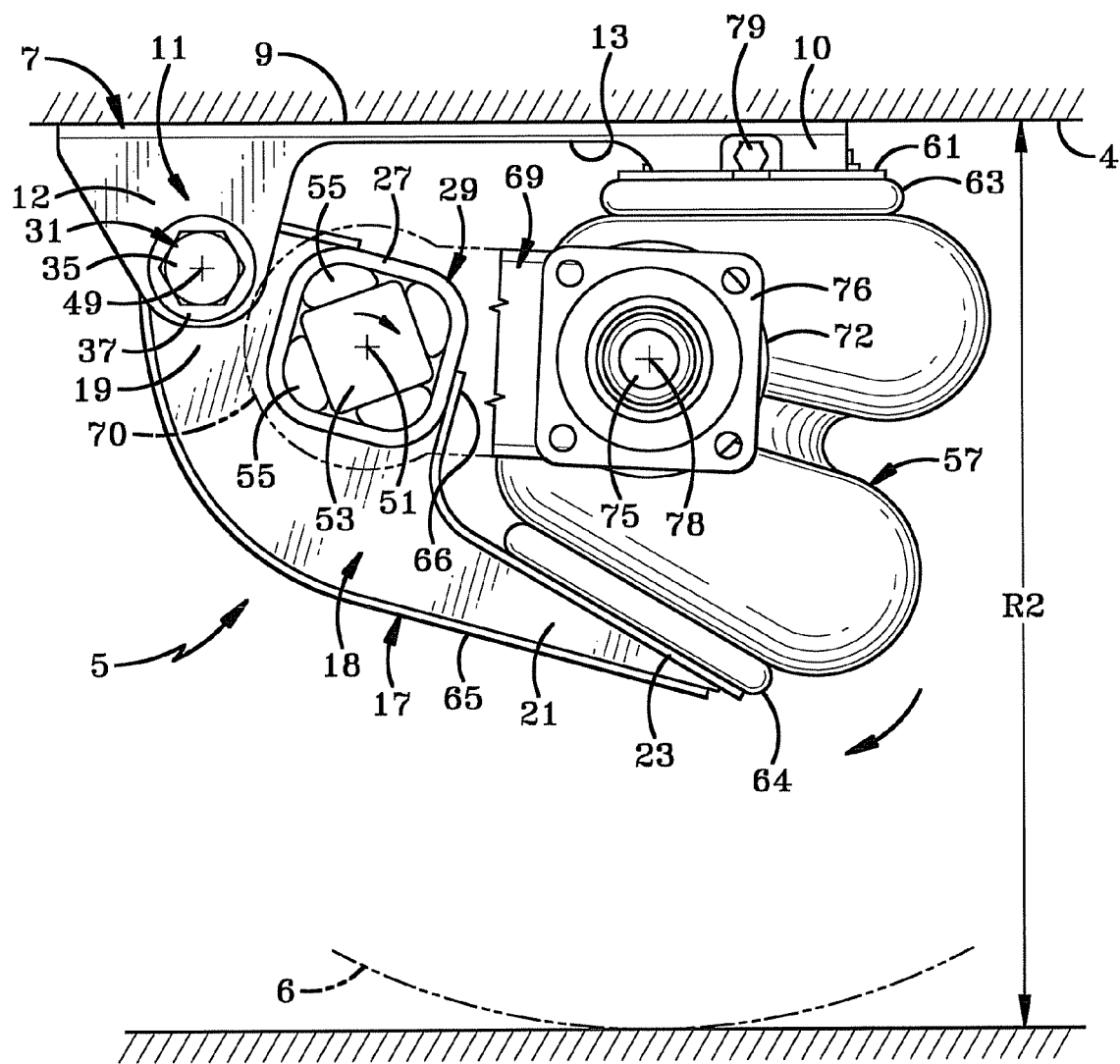
FIG. 13 is a view similar to FIGS. 10-12 with the vehicle suspension assembly in the full rebound position.

The manner of operation of suspension assembly 5 is best shown in FIGS. 10-13. FIG. 10 shows the position of air spring 57 and mounting arm 18 at the start of a jounce movement whereas only a slight rotational force indicated by Arrow A, is applied to stub shaft 53 that is absorbed by the elastomeric members 55 without air spring 57 experiencing any substantial movement. FIG. 11 shows both the torsion axle, and in particular stub shaft 53 and the air spring, in a nearly full jounce position as shown by the counterclockwise pivotal movement of air spring support arm 17 in the direction of Arrow B and the rotational movement of stub shaft 53 in the direction of Arrow C. FIG. 12 shows the start of the rebound of the suspension assembly. Rebound is a result of recovery, that is, return of energy stored in the suspension system of both the air spring and rubber springs or elastomeric members 55 in the torsion axle from inputs from bumps, etc. The springs try to return to their original heights but due to inertia in the system may travel beyond into a position which extends them to their limit. FIG. 13 shows the full rebound position where stub shaft 53 and its associated elastomeric members 55 and air spring 57 provide the desired stability to the suspension assembly by absorbing the various twisting and up and down or side to side movement exerted on the trailer wheels. The independent side-to-side absorption or compliance of the rubber torsion system provides roll control for stability and diagonal compliance to allow the suspension assembly to function on uneven terrain. This allows the suspension assembly to travel over one wheel bumps or encounter diagonal bumps.

Figure 14:
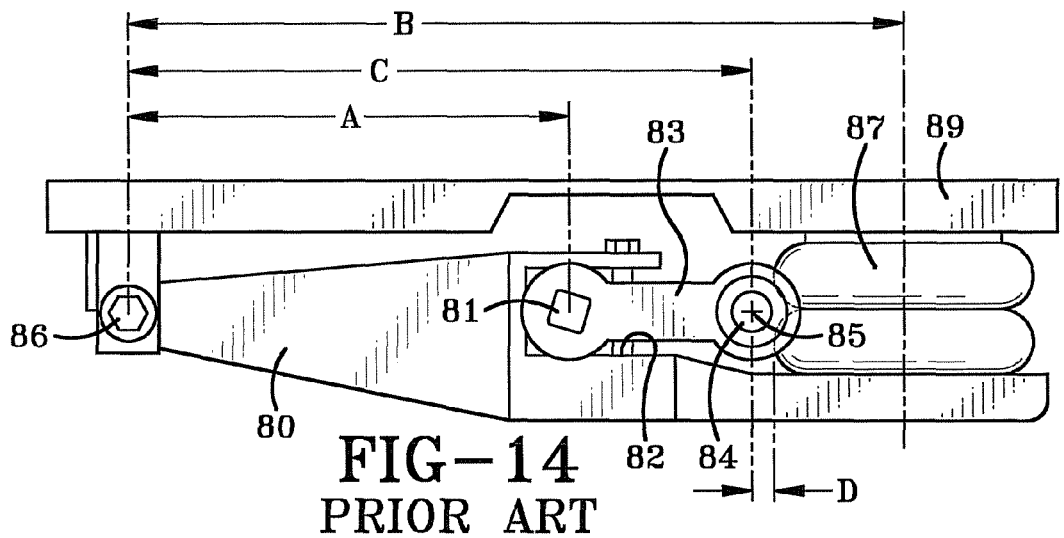
FIG. 14 is a diagrammatic side elevational view of a prior art combination air spring-torsion axle suspension assembly upon which the present invention is an improvement thereon.

Suspension assembly 5 of the present invention achieves all of the advantages achieved by the combination air spring-torsion axle suspension system described in U.S. Pat. No. 6,340,165, the contents of which are incorporated herein by reference. However, suspension system 5 provides considerable advantages over that of the suspension system of U.S. Pat. No. 6,340,165 by considerably reducing the length of the air spring mounting arm and moving the air spring closer inboard or forward to the pivot axis of the torsion axle and the pivot axis of the air spring support arm. FIG. 14 is a diagrammatic view of the suspension system of U.S. Pat. No. 6,340,165 which as shown therein has a long air spring support arm 80 which supports the stub shaft 81 of a torsion axle which is mounted within a cutout 82 of support arm 80. A spindle arm 83 is attached at one end to stub shaft 81 and has a spindle 84 attached to and extending outwardly by an opposite end of arm 83. Spindle 84 has an axis 85. An air spring 87 is mounted on the outer end of support arm 80 with its upper end being connected to a frame mounting bar 89. The suspension system made according to U.S. Pat. No. 6,340,165 has an arrangement as shown in FIG. 14 wherein the distance A between the pivot axis 86 of air spring support arm 80 to the axis of stub shaft 81 is known to be approximately 15 to 17 inches with the distance B between pivot axis 86 and the centerline of air spring 87 being between 26 and 28 inches, with the distance C between pivot axis 86 and axis 85 of spindle 84 being 21 and 23 inches. Also, the outermost surface of any of the convolutes of air spring 87 is always spaced rearward or outboard of spindle axis 85 as shown by distance D. The standard length of spindle arm 83 is 6 inches between axis 85 and the axis of stub shaft 84.

Figure 15:
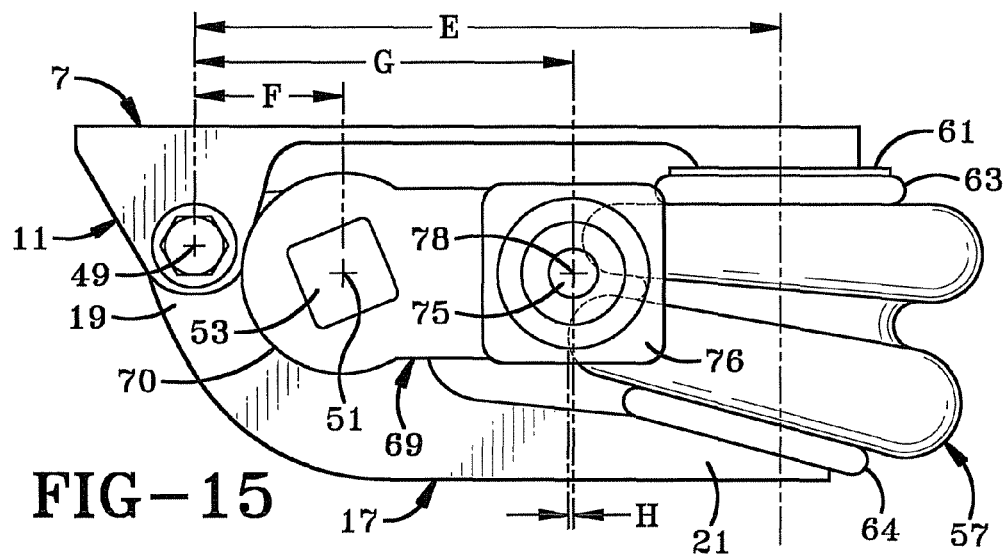
FIG. 15 is a diagrammatic side elevational view of the suspension assembly of the present invention showing the maximum outboard mounting position of the air spring from the axis of the wheel mounting spindle.
Figure 16:
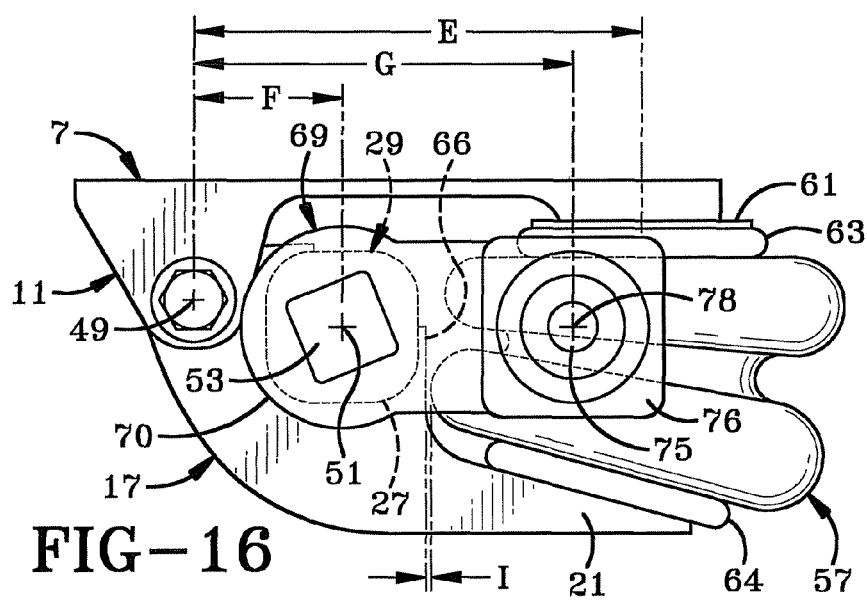
FIG. 16 is a view similar to FIG. 15 showing the minimum inboard mounting distance of the air spring from the outer tube of the torsion axle.

In accordance with one of the main features of the present invention shown particularly in FIGS. 8, 15 and 16, air spring 57 is spaced a considerable distance inboard or forward toward pivot axis 49 of support arm 17 than the suspension assembly of U.S. Pat. No. 6,340,165. This provides a considerably shorter air spring support arm 17 than that of support arm 80 of this prior art suspension assembly. This distance is represented by Dimension E and will have a length of between 11 and 14 inches which is considerably shorter than the known 26 to 28 inches represented by Dimension B of the prior art suspension system. Most importantly, when the air spring is at its maximum outboard or rearward position as shown in FIG. 15, the outer diameter of the air spring, whether it be a single or multiple convolute type of air spring, will always have a portion or distance spaced forward of spindle axis 78, represented by Dimension H in FIG. 15. As shown by distance D in the known prior art suspension system of FIG. 14, the outermost circumference or surface of air spring 87 is always rearward of the spindle axis 85, whereas in the present invention, air spring 57 will always have a portion forward of spindle axis 78, which distance is represented by Dimension H.

In the most compact suspension construction as shown in FIG. 16, air spring 57 will be located forward as much as possible and as close to end flange 66 of reinforcing plate 65 (FIG. 8) a distance represented by Dimension I without ever contacting the surface of flange 66. This distance will vary from a distance just slightly greater than 0 inches to approximately 6 inches at its maximum spacing as shown in FIG. 15. It is critical that the air spring, and in particular, the outermost portion of any of the convolutes never contact reinforcing plate end flange 66 since it will cause a rubbing action that will considerably shorten the life of the air spring by rubbing against the plate as the spring continually moves between its rebound and jounce positions. Furthermore, the distance represented by Dimension F between axis 49 of the air spring support arm pivot and axis 51 of the torsion axle will be between 3 and 6 inches whereas in the known prior art suspension system, the similar distance represented by Dimension A (FIG. 14) known to be between approximately 15 and 17 inches. Likewise, in the known prior art suspension system, distance between the pivot axis 86 and the spindle axis 85 represented by Dimension C is known to be between approximately 21 and 23 inches wherein the present invention distance represented by Dimension G will be between approximately 9.5 and 13 inches.

Thus, Applicant's suspension assembly 5 is able to achieve an extremely compact, yet highly efficient suspension assembly by shortening considerably the distance between pivot axis 49 of the air spring support arm 17 and the axis 51 of the torsion axle 29 and by moving air spring 57 forward to be closely adjacent torsion axle 29 as shown in FIG. 8, so long as sufficient spacing is provided between the outer surface of the air spring and surface 66 of the air spring support arm as shown by distance 1. Air spring 57 preferably is tucked closely between the support arm pivot and frame mounting bracket and the torsion axle swing arm which also is closely spaced from the pivot of the air spring support arm in contrast to be spaced considerably rearward therefrom in the known prior art as shown in FIG. 14. This short distance shown by Dimension F which is approximately between 3 and 6 inches will provide for a lower torque on axle tube 27 and enable lower stresses to be placed on the various components resulting in a lighter material being utilized since it is subjected to less forces that could cause breakage. Furthermore, this compact arrangement provides for a considerably less total axle movement while providing more total spindle travel. The increased total spindle travel results from the increased angular rotation of the axle and not from vertical travel of the axle. This enables the vertical design position of the axle to be closer to the bottom of the vehicle frame than with prior designs. This closer position of the frame to the axle allows a lower floor height and the shorter beam improves ground clearance, particularly in the rebound position because the rear end of the beam does not swing as far toward the ground and often is not even outside the radius of the tire as with prior art designs.

Thus, suspension assembly 5 provides for a more efficient, lightweight, stronger and more compact construction than the known prior art suspension assembly which utilizes the advantages of both an air spring and torsion axle suspension assembly of the known prior art as shown in U.S. Pat. No. 6,340,165.

In the preferred suspension assembly embodiment the distance of Dimension F is 3.8 inches, the distance of Dimension E is 11.8 inches and the distance of Dimension G is 9.8 inches. The maximum outer diameter of the flexible sleeve which forms the pressure chamber of air spring 57 is 10.4 inches and will be forward of axis 78 a distance of approximately 3.5 inches.

Figure 17:
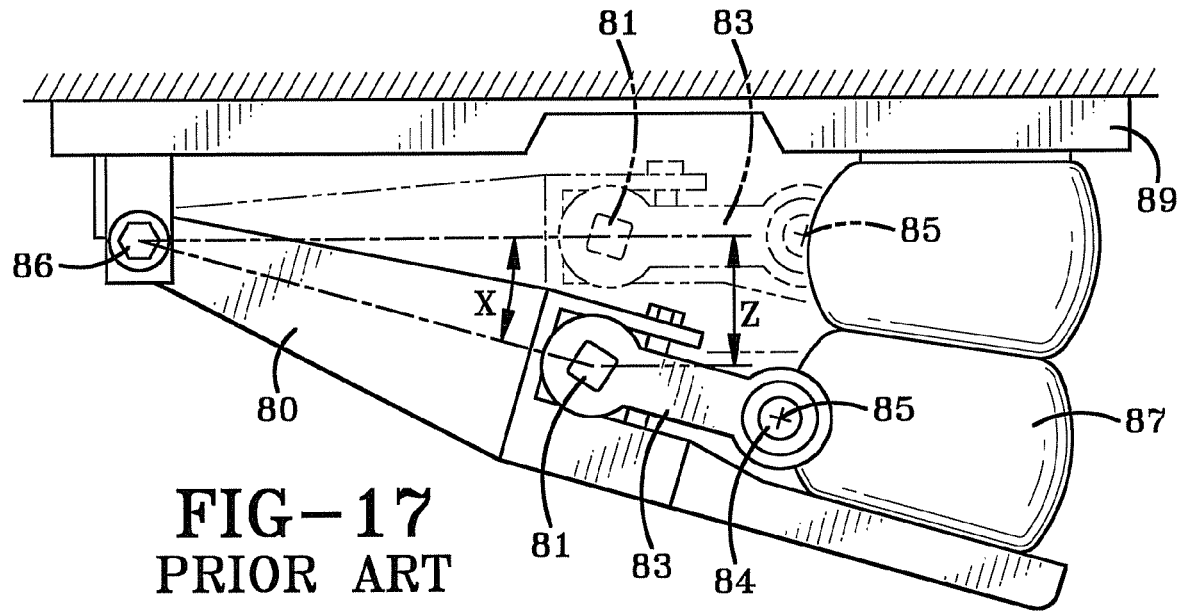
FIG. 17 is a diagrammatic side elevational view of the prior art suspension system showing the vertical travel distance of the torsion axle.

Another advantage of the present invention is that the compact assembly of the suspension limits the vertical travel distance of the torsion axle in comparison to that of the known prior art suspension systems such as shown in U.S. Pat. No. 6,340,165. FIG. 17 shows that in the known prior art suspension system of which the present invention is an improvement thereon, the torsion axle, and in particular the stub shaft 81, will travel through an angular distance X between its full rebound and full jounce positions of between 16° and 19°. This results in the stub axle shaft 81 traveling a generally vertical distance of between 4.79 inches and 4.90 inches as shown by distance Z. This is due to the considerable length of support arm 80 as shown by distance A in FIG. 14.

Figure 18:
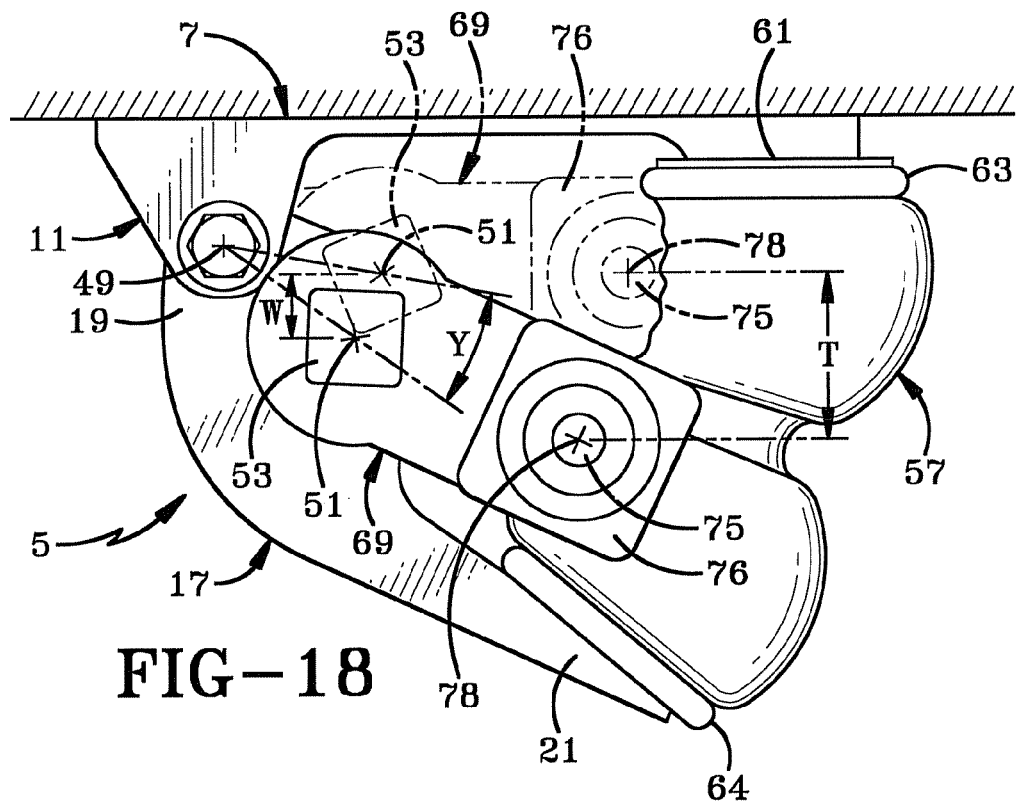
FIG. 18 is a view similar to FIG. 17 showing the vertical travel distance of the torsion axle in the suspension assembly of the present invention.

However, due to the compact condition of suspension assembly 5, the vertical travel of stub shaft 53 shown by distance W, is within a range of 1.95 inches and 3.2 inches, even though stub shaft 53 moves through an angle within a range of 25° to 40° as indicated by angular distance Y. For most suspension systems angle Y will have a preferred range of 30° and 37°. This reduced vertical axle tube travel combined with increased angular rotation of the torsion axle allows a lower design height and a lower frame height compared to prior suspension assemblies. Yet, total spindle travel T (FIG. 18) is increased providing a softer ride and increased bump tolerance. Furthermore, for most suspension assemblies, spindle arm 69 has a length of approximately 6 inches measured between axil 51 and 78. As shown in FIG. 18, this results in spindle axis 78 of spindle arm 69 having a vertical travel distance T within the range of 5 inches and 7 inches.

Also, the shorter distance F compared to the much longer distance A (FIGS. 14, 15 and 16) provides greatly reduced stress in the torsion axle tube 27 when the suspension is subjected to roll or diagonal walk or single wheel bump inputs. The shorter the lever through which these stability forces act, the lower stress on the axle tube and the trailing beam (air spring support beam), the lighter the suspension assembly can be providing for a more efficient design of support arm 17.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A vehicle suspension assembly comprising:
a frame bracket;
an air spring support arm pivotally attached to the frame bracket and having a pivot axis;
a torsion axle operatively attached to the support arm and having a pivot axis spaced from the pivot axis of the air spring support arm;
an air spring attached at one end to the frame bracket and at an opposite end to the support arm, said air spring having at least one convolute with an outer surface;
a spindle arm attached to the torsion axle and having a distal end extending in a direction rearward adjacent the air spring;
a spindle mounted on and extending outwardly from the distal end of the spindle arm and having an axis, wherein the spindle is adapted to mount a tire; and
wherein the air spring support arm, air spring, and frame bracket are within a diameter of the tire.

2. The vehicle suspension assembly defined in claim 1 wherein the axis of the torsion axle is spaced within a general range of three to six inches from the pivot axis of the air spring support arm.

3. The vehicle suspension assembly defined in claim 2 wherein the axis of the torsion axle is spaced approximately 3.8 inches from the pivot axis of the air spring support arm.

4. The vehicle suspension assembly defined in claim 1 wherein the pivot axis of the air spring support arm is spaced within a general range of eleven to fourteen inches from an axial centerline of the air spring.

5. The vehicle suspension assembly defined in claim 4 wherein the pivot axis of the air spring support arm is spaced 11.8 inches from the axial centerline of the air spring.

6. The vehicle suspension assembly defined in claim 1 wherein the pivot axis of the air spring support arm is spaced within a general range of 9.5 inches to 13 inches from the axis of the spindle.

7. The vehicle suspension assembly defined in claim 6 wherein the pivot axis of the air spring support arm is spaced 9.8 inches from the axis of the spindle.

8. The vehicle suspension assembly defined in claim 1 wherein the distance from the pivot axis of the air spring support arm to the axial centerline of the air spring is more than twice the distance between the pivot axis of the air spring support arm and the axis of the torsion axle.

9. The vehicle suspension assembly defined in claim 1 wherein the distance from the pivot axis of the air spring support arm to the axis of the spindle is more than twice the distance between the pivot axis of the air spring support arm and the axis of the torsion axle.

10. A vehicle suspension assembly comprising:
a frame bracket;
an air spring support arm pivotally attached to the frame bracket and having a pivot axis;
a torsion axle operatively attached to the support arm and having a pivot Axis spaced within the range of between three and six inches from the pivot axis of the air spring support arm;
an air spring mounted between the frame bracket and the support arm having an axial centerline spaced within the range of eleven and fourteen inches from the pivot axis of the air spring support arm;
a spindle arm attached to the torsion axle; and
a spindle mounted on the spindle arm having an axis spaced within the range of nine and one-half and thirteen inches from the pivot axis of the air spring support arm; wherein the spindle is adapted to mount a tire; and wherein the air spring support arm, air spring, and frame bracket are within a diameter of the tire.

11. The vehicle suspension assembly defined in claim 10 wherein the air spring has a flexible sleeve forming an interior air chamber; and in which at least a portion of the air spring sleeve is between the axis of the spindle and the axis of the torsion axle.

12. The vehicle suspension assembly defined in claim 11 wherein the air spring support arm includes a pair of spaced arm members; in which a reinforcing plate extends between upper edges of the spaced arm members and terminates in an end flange attached to the torsion axle; and in which the flexible sleeve of the air spring is spaced within six inches but free of contact from said end flange.

13. The vehicle suspension assembly defined in claim 10 wherein the air spring support arm is generally L-shaped; in which a pivot assembly pivotally attaches an upstanding leg of the L-shaped support arm to the frame bracket; and in which the torsion axle is mounted in a cutout formed in said upstanding leg.

14. A vehicle suspension assembly comprising: a frame bracket;
an air spring support arm pivotally attached to the frame bracket and having a pivot axis;
a torsion axle operatively attached to the support arm and having a pivot axis spaced from the pivot axis of the air spring support arm;
an air spring attached at one end to the frame bracket and at an opposite end to the support arm, said air spring having at least one convolute with an outer surface;
a spindle arm attached to the torsion axle and having a distal end extending in a direction toward the air spring;
a spindle mounted on and extending outwardly from the distal end of the spindle arm and having an axis; and
said pivot axis of the torsion axle having a vertical travel distance in the range of 1.5 inches to 3.5 inches as the air spring moves between full jounce and full rebound positions; wherein the spindle is adapted to mount a tire; and
wherein the air spring support arm, air spring, and frame bracket are within a diameter of the tire.

15. The vehicle suspension assembly defined in claim 14 wherein the axis of the torsion axle is spaced within a general range of three to six inches from the pivot axis of the air spring support arm.

16. The vehicle suspension assembly defined in claim 15 wherein the vertical travel distance of the torsion axle is in the range of 2 inches to 3 inches.

17. The vehicle suspension assembly defined in claim 14 wherein the torsion axle swings through an arc of between 25° and 40° as the air spring moves between the full jounce and full rebound positions.

18. The vehicle suspension assembly defined in claim 17 wherein the torsion axle swings through an arc of between 30° and 38° as the air spring moves between the full jounce and full rebound positions.

19. The vehicle suspension assembly defined in claim 14 wherein the spindle arm has a length of 6 inches; and wherein the spindle has a vertical travel distance in the range of 5 inches and 7 inches as the air spring and torsion axle move between the full jounce and full rebound positions.

* * * * *